United States Patent
Li et al.

(10) Patent No.: US 9,588,253 B2
(45) Date of Patent: Mar. 7, 2017

(54) METHOD AND APPARATUS FOR REMOTE SIPHON DRAINAGE TYPE RAINFALL MEASUREMENT WITH SELF-COMPENSATION FUNCTION

(75) Inventors: Qing Li, Hangzhou (CN); Wei Wang, Hangzhou (CN); Xiong Li, Hangzhou (CN); Hongyang Li, Hangzhou (CN); Gang Li, Hangzhou (CN)

(73) Assignee: China Jiliang University, Hangzhou (CN)

( * ) Notice: Subject to any disclaimer, the term of this patent is extended or adjusted under 35 U.S.C. 154(b) by 868 days.

(21) Appl. No.: 13/457,559

(22) Filed: Apr. 27, 2012

(65) Prior Publication Data

US 2012/0253675 A1 Oct. 4, 2012

Related U.S. Application Data

(63) Continuation of application No. PCT/CN2010/076190, filed on Aug. 20, 2010.

(30) Foreign Application Priority Data

Nov. 9, 2009 (CN) .......................... 2009 1 0154169

(51) Int. Cl.
*G01W 1/14* (2006.01)

(52) U.S. Cl.
CPC ..................... *G01W 1/14* (2013.01)

(58) Field of Classification Search
CPC ................. G06F 19/00; G01W 1/14
See application file for complete search history.

(56) References Cited

U.S. PATENT DOCUMENTS 6,027,639 A * 2/2000 Lenhart et al. ............... 210/108
8,512,555 B1 * 8/2013 Allen et al. .............. 210/170.03
(Continued)

FOREIGN PATENT DOCUMENTS

CN 87210894 U 4/1988
CN 101059566 A 10/2007
(Continued)

OTHER PUBLICATIONS

International Search, Written Opinion, and International Preliminary Report on Patentability Chapter I (and English Translations of each).

*Primary Examiner* — Gregory J Toatley
*Assistant Examiner* — Kyle R Quigley
(74) *Attorney, Agent, or Firm* — Troutman Sanders LLP; Ryan A. Schneider; Chris N. Davis

(57) ABSTRACT

A siphon drainage type rainfall remote measurement device with self-compensation function is provided. The bottom existence of a rain collection barrel (2) is connected via a flexible tube (14) to the bottom of a rainfall measuring tube (13) to which a siphon (5) is attached. The tube (13) and a measurement instrument (6) are installed on a holding frame (9). The instrument (6) is connected to a pressure sensor (12) and an accumulator (11) at the bottom of the tube (13). The whole device is fixed in an outer barrel (1). According to the pressure of the bottom of the tube (13), the sensor (12) measures the height of the water level in the tube (13) which is directly proportional to the rainfall. The sensor (12) signal processed by the instrument (6) is transformed into the rainfall, processed by a compensation algorithm and sent by GSM or GPRS.

7 Claims, 5 Drawing Sheets

(56) References Cited

U.S. PATENT DOCUMENTS

| | | | |
|---|---|---|---|
| 2003/0094407 A1* | 5/2003 | de Ridder et al. | 210/120 |
| 2008/0178943 A1* | 7/2008 | Rashid | 137/398 |
| 2008/0184788 A1* | 8/2008 | Jeong et al. | 73/170.21 |
| 2008/0277327 A1* | 11/2008 | Hersey et al. | 210/170.03 |
| 2012/0325766 A1* | 12/2012 | Boisvert | 215/10 |
| 2013/0220440 A1* | 8/2013 | Corbett | 137/142 |

FOREIGN PATENT DOCUMENTS

| | | | |
|---|---|---|---|
| CN | 101718881 A | | 10/2007 |
| CN | 201021943 Y | * | 2/2008 |
| CN | 201449459 U | * | 5/2010 |
| WO | 9120004 A1 | | 12/1991 |

\* cited by examiner

METHOD AND APPARATUS FOR REMOTE SIPHON DRAINAGE TYPE RAINFALL MEASUREMENT WITH SELF-COMPENSATION FUNCTION

CROSS-REFERENCE TO RELATED APPLICATIONS

This application is a continuation of International Application No. PCT/CN2010/076190, filed 20 Aug. 2010, which claims the benefit of CN 200910154169.1, filed 9 Nov. 2009, both herein fully incorporated by reference.

FIELD OF THE INVENTION

The present invention relates to rainfall measurement, and particularly to a method and apparatus for the remote siphon drainage type rainfall measurement with self-compensation function.

BACKGROUND OF THE INVENTION

Rainfall measurement is needed in the fields of meteorology, water conservation, geological disaster prevention, etc. For the remote rainfall measurement in the wild, considering the power consumption during drainage, the existing apparatus for remote automatic rainfall measurement uses a tipping bucket sensor, but its accuracy is relatively low, and the measurement error is typically ±4%. The existing apparatus for the siphon drainage type rainfall measurement relies on a paper-tape recording equipment with mechanical mechanism, which needs workers arrive at the scene to observe the recorded plot on the paper-tape to obtain the amount of rainfall, and its measurement error is ±2%. The message on the paper cannot be transmitted remotely. Therefore, there is a need for a method and apparatus for remote measurement, which not only meet the requirements of the low power consumption in the wild, but also realize high-accuracy survey of the rainfall.

SUMMARY OF THE INVENTION

The purpose of the present invention is to provide a method and an apparatus for the remote siphon drainage type rainfall measurement with self-compensation function, which can realize on-site survey with low power consumption, automatic data transmission with long distance, automatic drainage by making use of the siphon theory and the self-compensation function during siphon drainage.

The technical solutions the invention takes to solve the technical problems are:

1. A method for remote siphon drainage type rainfall measurement with self-compensation, wherein the method comprises the following steps:

the rainfall at any time with self-compensation can be expressed as:

$$h_{rain}(t) = K \cdot \left[ n \cdot h_N + \sum_{j=0}^{n} \Delta h_N(j) + h_{s(n+1)}(t) \right] \quad (1)$$

$\Delta h_N(j)$ in formula (1) is the amount of rainfall in $t_{1(n+1)} \leq t \leq t_{2(n+1)}$, i.e., in the siphon drainage process during a cycle of the j+1th change of the water level of the measuring tube, as the rainfall rate is not constant, each $\Delta h_N(j)$ is generally different, i.e., $\Delta h_N(j-1) \neq \Delta h_N(j) \neq \Delta h_N(j+1)$ and if i<0, then $\Delta h_N(i)=0$, n means that the loop of the change of the water level of the measuring tube has completed n cycles, the value of n can be 0, 1, 2, . . . ; K is a scale factor for converting the water level of the measuring tube into the amount of rainfall; $h_{s(n+1)}(t)$ is expressed as:

$$h_{s(n+1)}(t) = \begin{cases} h(t); t_{2n} \leq t \leq t_{1(n+1)} \\ h_N + h(t) - h_1(t); t_{1(n+1)} \leq t \leq t_{2(n+1)} \end{cases} \quad (2)$$

the formula (2) expresses the instantaneous aggregate-value of the water level of the measuring tube at any cycle of the water level of the measuring tube rising and falling by siphon drainage ($t_{2n} \leq t \leq t_{2(n+1)}$) in rainfall process; h(t) in formula (2) is the actual water level of the measuring tube; $h_1(t)$ in $t_{1(n+1)} \leq t \leq t'_{2(n+1)}$ is an inherent siphon drainage line, which is a known relationship that has been predetermined, while in $t'_{2(n+1)} \leq t \leq t_{2(n+1)}$, $h_1(t)$ is an extended line of the inherent siphon drainage line; $t_{2(n+1)}$ can be determined by the moment when the cycle of the water level of the measuring tube rising and falling by siphon drainage reaches its lowest point, and this can be realized by corresponding programs at MCU in the measuring device; after obtaining $t_{2(n+1)}$, the programs of the MCU will make the extended line of the inherent siphon drainage line, and then $h_1(t)$ will be totally determined in $t_{1(n+1)} \leq t \leq t_{2(n+1)}$; substituting the result of formula (2) to formula (1) to obtaining the measured value of the amount of rainfall with compensation $h_{rain}(t)$.

2. An apparatus for remote siphon drainage type rainfall measurement with self-compensation function:

The exit in the bottom of the water butt is connected to the bottom of the rainfall measuring tube by the water hose. The siphon is in the wall of the rainfall measuring tube. The rainfall measuring tube is installed on the support bracket with measuring device. The measuring device is connected with the pressure sensor installed in the bottom of rainfall measuring tube and battery. The whole apparatus is installed in the outer barrel.

The measuring device described includes an amplification and filtering circuit, an A/D conversion circuit, a single-chip microcomputer and a remote transmission module GSM or GPRS. One terminal of the amplification and filtering circuit is connected with the pressure sensor (12), and the other terminal is connected with the remote transmission module GSM or GPRS via A/D conversion circuit and the single-chip microcomputer.

The amplification and filtering circuit described uses a differential structure or an integrated instrument amplifier to constitute the amplification and filtering circuit. The input signal is the output voltage signal of the pressure sensor which is in proportional to the water level, and the output signal is the output voltage signal of the amplification and filtering circuit.

The advantages of the present invention are as follows.

The present invention can realize on-site survey with low power consumption, automatic data transmission with long distance, automatic drainage by making use of the siphon theory and the self-compensation function during siphon drainage. It will greatly improve the accuracy of the remote automatic rainfall measurement.

BRIEF DESCRIPTION OF THE DRAWINGS

FIG. 4-1 is a plot illustrating the siphon process with rainfall;

FIG. 4-2 is a plot illustrating the siphon process without rainfall;

FIG. 4-3 is a plot illustrating rainfall in the siphon process with rainfall;

FIG. 6-1 is a plot that shows the n+1th cycle of the water level of the measuring tube rising and falling by siphon drainage with rainfall;

FIG. 6-2 is a plot that shows the siphon process without rainfall;

FIG. 6-3 is a plot that shows the rainfall in the siphon process with rainfall.

Figure 1:
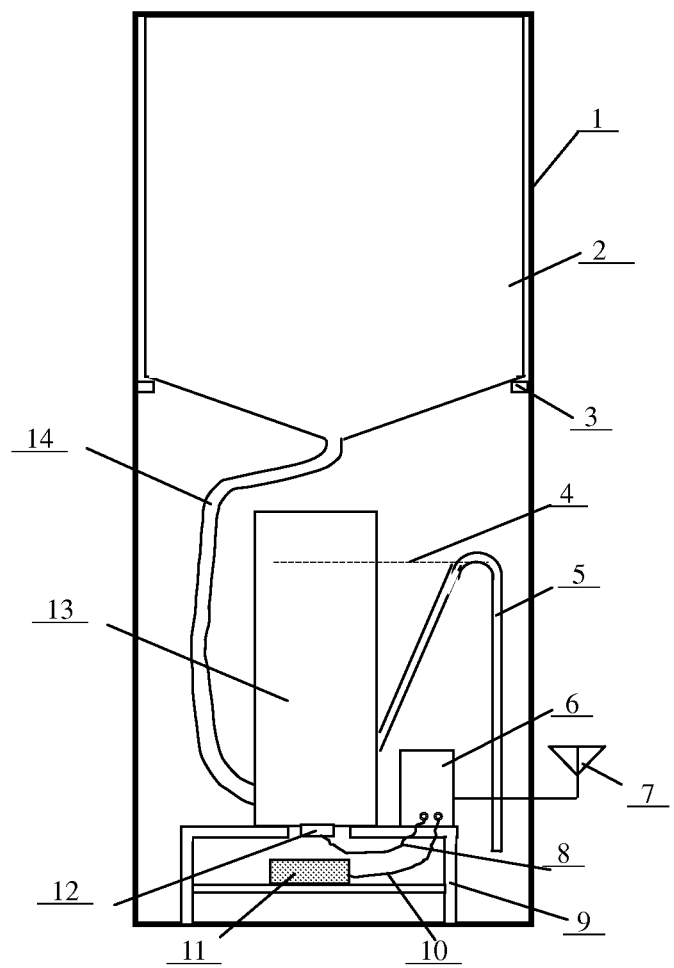
FIG. 1 is a schematic of a measuring apparatus according to the present invention.

In the drawings: (1)—Outer barrel, (2)—Water butt, (3)—Support ring, (4)—The height of siphon, (5)—Siphon, (6)—Measuring device, (7)—Antenna, (8)—Signal transmission lines, (9)≠Support bracket, (10)—Power line, (11)—Battery, (12)—Pressure sensor, (13)—Rainfall measuring tube, (14)—Water hose.

DETAILED DESCRIPTION OF THE INVENTION

The description below will be made to the embodiments of the present invention in conjunction with the annexed drawings.

As shown in FIG. 1, an exit at the bottom of a water butt (2) is connected to the bottom of a rainfall measuring tube (13) via a water hose (14). A siphon (5) is in the wall of the rainfall measuring tube (13). The rainfall measuring tube (13) and a measuring device (6) are installed on a support bracket (9). The measuring device (6) is connected with a pressure sensor (12) which is installed in the bottom of the rainfall measuring tube (13) through a signal transmission line (8), and it is also connected with a battery (11) through a power line (10). The whole apparatus is installed in an outer barrel (1). The water butt (2) is fixed on a support ring (3) and the support ring is in the outer barrel (1). The measuring device (6) is connected to an antenna (7).

Figure 2:
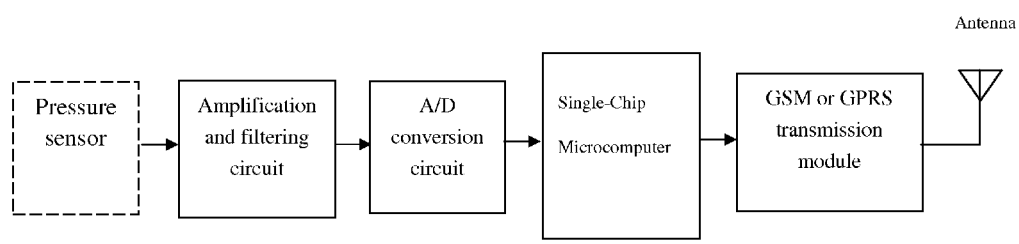
FIG. 2 is a block diagram of a measuring device according to the present invention.
Figure 3:
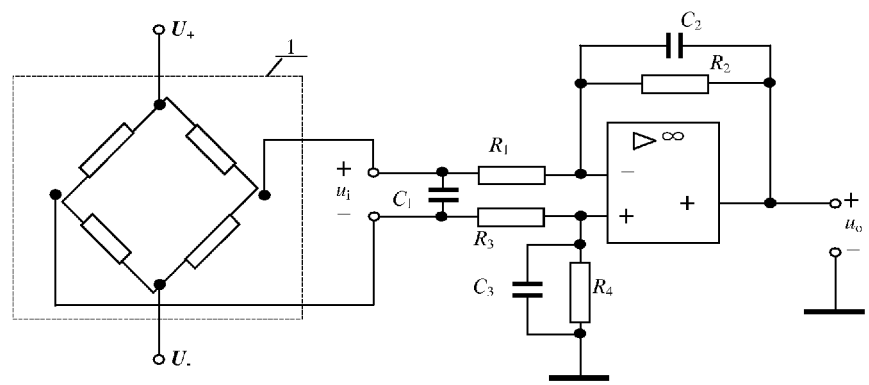
FIG. 3 is circuit diagram of the amplification and filtering circuit according to the present invention.

As shown in FIG. 2 and FIG. 3, the measuring device (6) described includes a amplification and filtering circuit, an A/D conversion circuit, a single-chip microcomputer and a remote transmission module GSM or GPRS. One terminal of the amplification and filtering circuit is connected with the pressure sensor (12), and the other terminal is connected with the remote transmission module GSM or GPRS via the A/D conversion circuit and the single-chip microcomputer.

The amplification and filtering circuit described uses differential structure or integrated instrument amplifier to constitute the amplification and filtering circuit. The input signal is the output voltage signal of the pressure sensor which is in proportional to the water level, and the output signal is the output voltage signal of the amplification and filtering circuit.

As shown in FIG. 1, the outermost portion of this apparatus is a protection barrel; the upper portion of the internal portion of the apparatus is a water butt (2), which collects natural rainfall. The rain flows through the water hose (14) into the rainfall measuring tube (13) below. The rainfall measuring tube (13) is a cylindrical hollow tube. In the bottom of rainfall measuring tube (13), there is a rainproof pressure sensor (12). According to the principle that the pressure of the bottom of the rainfall measuring tube is in proportion to the water level of the rainfall measuring tube, the pressure sensor (12) can measure the water level of the rainfall measuring tube, while the water level is in proportion to the rainfall. There is a siphon (5) in the wall of the rainfall measuring tube (13) which is used for the automatic water drainage of the rainfall measuring tube (13). According to the siphon principle, when the water level of the measuring tube reaches a certain height (The dashed line in FIG. 1 means the height of siphon (4)), the siphon phenomenon occurs, and the water inside the rainfall measuring tube (13) will be discharged through the siphon automatically. The measuring device will process the signal of the pressure sensor (12) by a series of steps, such as amplification, filtering, A/D conversion, value conversion, compensation calculations, encoding and remote transmission to realize the remote automatic rainfall measurement. The battery (11) is the power of the measuring device (6) and pressure sensor (12). Because of using the automatic drainage realized by siphon principle and rainfall measurement realized by pressure measurement, the power consumption of the apparatus is very low, and it's possible to use a battery for long-term supply.

The key feature of the measuring device (6) is the self-compensation algorithm described later, which makes the precision of the device much higher than the existing tipping-bucket rain recorder and siphon rainfall recorder. The component of the measuring device is shown in FIG. 2.

The amplification and filtering circuit in FIG. 2 is an integrated operational amplifier of low power consumption, low temporal and thermal drift and low noise, which takes use of differential line structure. The circuit is shown in FIG. 3. It can also use a variety of integrated instrument amplifier modules to constitute the amplification and filtering circuit. $u_i$ is the input voltage signal of the amplification and filtering circuit, which is also the output voltage signal of the pressure sensor that is in proportion to the water level. $u_o$ is the output voltage signal of the amplification and filtering circuit.

A/D conversion circuit can be implemented with almost any kind of successive comparing parallel A/D converter or $\Sigma$-$\Delta$ type serial A/D converter. In order to give consideration to speed, cost and power consumption, the present invention uses a 16 bit $\Sigma$-$\Delta$ type serial A/D converter (MAX1415 or MAX7705).

Single chip microcomputer (MCU) can be any product available. Considering of the power consumption, the present invention selects MSP430F series of TI. Specific model: MSP 430F135, or MSP 430F149.

Remote transmission module GSM or GPRS can use productions of U.S. SIMCOM, German Siemens, or Taiwan BenQ, and the present invention uses sim300c of SIMCOM or BENQ M23 of BenQ.

The method of rainfall measurement according to the present invention is as follows.

Figures 1, 4:
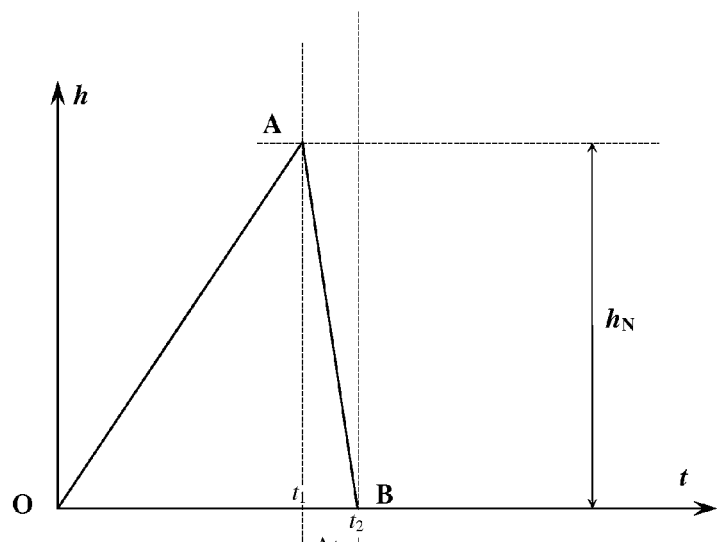
Figures 2, 4:
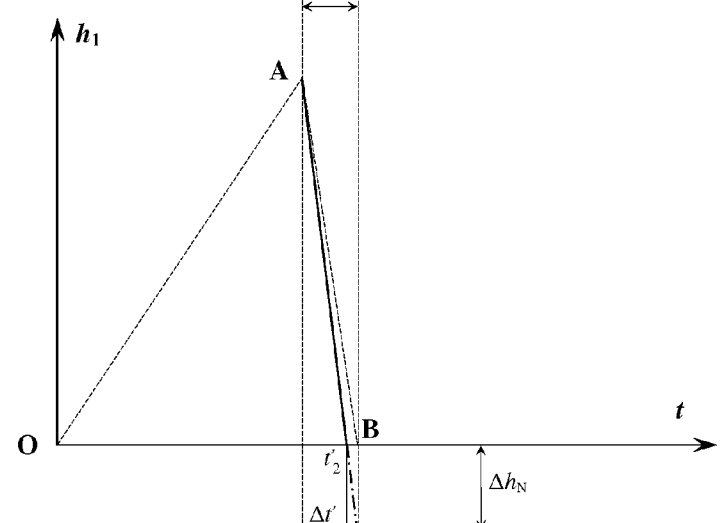
Figures 3, 4:
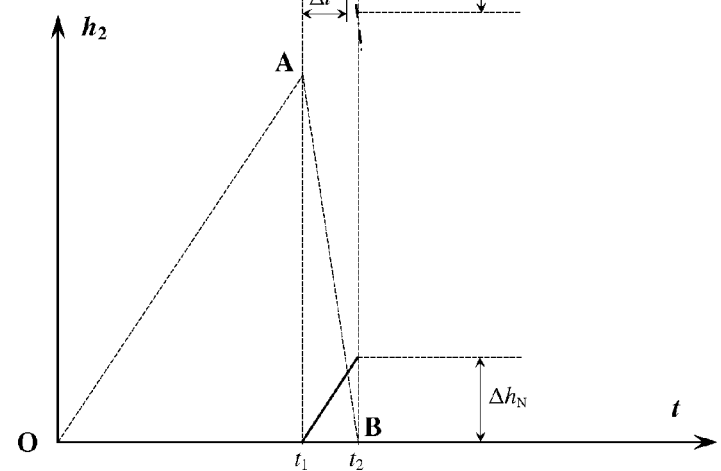
Figure 5:
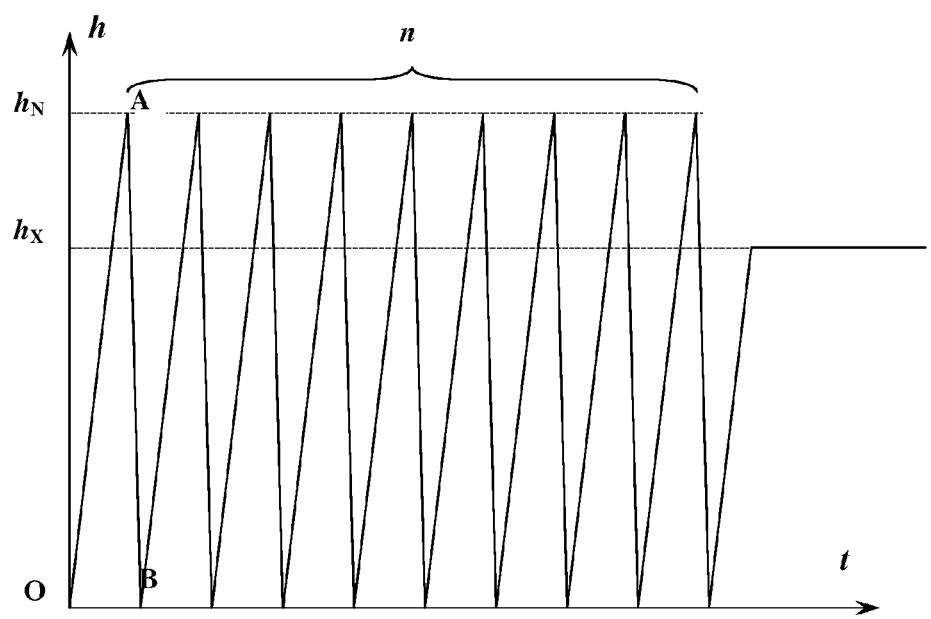
FIG. 5 is the cyclic O-A-B graph drawn on the coordinate paper by the existing siphon rainfall recorder.

Drainage realized by siphon principle does not need energy, and this is a good way to reduce energy consumption for the automatic measurement in the wild. Assume that the rainfall speed is invariable, FIG. 4-1 reflects the variation process of the water level of the rainfall measuring tube with rainfall. Segment O→A reflects the water level of the rainfall measuring tube rising by the rain. When the water level of the measuring tube reaches $h_N$, siphon phenomenon occurs, and then the water level of the measuring tube falls. Segment A-B reflects this, and this process relies on siphon principle. In the cycle of water level of the rainfall measuring tube rising and falling, point B is the point O of the next cycle of water level, and the water level starts rising from the point B. The existing siphon rainfall recorder uses a set of mechanical structure to make the height of the nib changing with the water level of the measuring tube. After this, the cyclic curve O-A-B can be drawn on the coordinate paper (As shown in FIG. 5). After the rain stops, the meteorologist counts the amount of segment O-A on the coordinate paper (the amount of $h_N$, n), then measures the height of the segment which does not reach point A in the last cycle ($h_X$). (As shown in FIG. 5). $h_\Sigma = n \cdot h_N + h_X$. $h_\Sigma$, the rainfall of this rainfall process. When the water level of the measuring tube reaches the height of $h_N$ (siphon height), the siphon phenomenon occurs, and the water level starts to fall (segment A-B, as shown in FIG. 4-1). As the rain does not stop, rainfall $\Delta h_N$ will be omitted in $\Delta t = t_2 - t_1$ (As shown in FIG. 4-1) if $h_N$ is used to calculate rainfall only. The value of $\Delta h_N$ is shown in FIG. 4-3. $\Delta h_N$ is the full line in $t_1 \leq t \leq t_2$, and it is in parallel with segment O-A. Therefore, the total omitted rainfall of $h_\Sigma$ ($h_\Sigma = n \cdot h_N + h_X$) measured by the existing siphon rainfall recorder is $\Delta h_\Sigma$ ($\Delta h_\Sigma = n \cdot \Delta h_N$). The actual rainfall should be $h_\Sigma + \Delta h_E = n \cdot h_N + h_X + n \cdot \Delta h_N$.

According to the analysis above, the present invention puts forward a compensation algorithm to eliminate errors in the siphon process. FIG. 4-1 shows the variation process of the water level of the measuring tube with rainfall, and it is broken down into FIG. 4-2 and FIG. 4-3. FIG. 4-2 shows the variation process of the water level of the measuring tube without rainfall. FIG. 4-3 shows the changing of the water level caused by rainfall. Dotted line O-A-B in FIG. 4-2 and FIG. 4-3 is the actual changing curve of the water level shown in FIG. 4-1. The actual changing curve of the water level without rainfall shown in FIG. 4-2 is the full line in $t_1 \leq t \leq t'_2$. The chain line in $t'_2 \leq t \leq t_2$ is the extended line of the full line in $t_1 \leq t \leq t'_2$. The chain line in $t'_2 \leq t \leq t_2$ will not exist in the siphon process without rainfall. The full line in $t_1 \leq t \leq t'_2$ and the chain line in $t'_2 \leq t \leq t_2$ are obtained by the subtraction between the curve of FIG. 4-1 and the curve of FIG. 4-3. It can be drawn from FIG. 4-1, FIG. 4-2 and FIG. 4-3 that the falling rate of water level in the siphon process with rainfall (As shown in FIG. 4-1, segment A-B) is slower than the rate without rainfall (As shown in FIG. 4-2, the full line in $t_1 \leq t \leq t'_2$), the reason is that there is rainfall in the former siphon process. To illustrate this, the rainfall rate in $t_1 \leq t \leq t_2$ and $0 \leq t \leq t_1$ will be assumed to be the same, and the curve of FIG. 4-3 is in parallel with the segment O-A in FIG. 4-1. It can be seen from the siphon principle that the curve of the falling water level in $t_1 \leq t \leq t'_2$ is a fixed line after the measurement tube and the siphon being made, and it won't change with rainfall. In actual measurement, the segment of the changing water level corresponding to the actual rainfall in $t_1 \leq t \leq t_2$ (As shown in FIG. 4-3) will be obtained, after the actual curve of the changing water level of the measuring tube in the siphon process (As shown in FIG. 4-1, segment A-B) minus the segment of the changing water level in the siphon process without rainfall and its extended line (As shown in FIG. 4-2, the full line in $t_1 \leq t \leq t'_2$, and the chain line in $t'_2 \leq t \leq t_2$), so as to obtain $\Delta h_N$. It should be noted that, as the actual rainfall rate is not constant, the segments O-A and A-B of FIG. 4-1 are not linear in actual measurement. However, the actual segment of changing water level in the siphon process without rainfall is linear. So, the expression of compensation in actual measurement can be obtained from FIG. 4. h(t) represents the actual curve of the changing water level of the measuring tube with rainfall, $h_1(t)$ represents the segment of the changing water level in the siphon process without rainfall and its extended line ($h_1(t)$ include the full line and the chain line), $h_2(t)$ represents the changing of the water level caused by rainfall in $t_1 \leq t \leq t_2$ when siphon phenomenon occurs. The expression of rainfall with compensation in single measurement ($0 \leq t \leq t_2$) is:

$$h_s(t) = \begin{cases} h(t); 0 \leq t \leq t_1 \\ h_N + h_2(t) = h_N + h(t) - h_1(t); t_1 \leq t \leq t_2 \end{cases} \quad (1)$$

h(t) in formula (1) is measured by the measuring system shown in FIG. 1. The full line part of $h_1(t)$ is measured by the calibration test after the siphon and measuring tube are made and extended according to the slope of itself. The length of extended line is determined by $t_2$, and $t_2$ is determined by the rainfall rate. $t_2$ is big when the rainfall rate is big. $t_2$ is small when the rainfall rate is small. The time of every cycle of single measurement is unequal usually. $h_N$ is the maximum value of h(t), and the value of $h_N$ is determined by the structure of siphon and measuring tube. $h_N$ is a constant value in every single measurement. As the actual rainfall rate is changing, the actual curve of h(t) is not necessarily a straight line (usually a broken line), and $h_2(t)$ is not necessarily the translation of segment O-A of h(t).

According to the formula upper, the rainfall at any time can be expressed as:

$$h_{rain}(t) = K \cdot \left[ n \cdot h_N + \sum_{j=0}^{n} \Delta h_N(j) + h_{s(n+1)}(t) \right] \quad (2)$$

$\Delta h_N$ (j) in formula (2) is the rainfall in $t_1 \leq t \leq t_2$, i.e., in the siphon drainage process during a cycle of the j+1th change of the water level of the measuring tube, and the cycle is showed in FIG. 4-1. ($\Delta h_N$ equals to $\Delta h_N$(j), FIG. 4-3). As the rainfall rate is not constant, each $\Delta h_N$ (j) is generally different, i.e., $\Delta h_N$ (j−1)≠$\Delta h_N$ (j)≠$\Delta h_N$ (j+1) and if i<0, then $\Delta h_N$ (i)=0. n, means the loop showed in FIG. 4-1 has completed n cycles, the value of n can be 0, 1, 2, . . . ; K is a scale factor for converting the water level of the measuring tube into the rainfall. According to the formula (1), $h_{s(n+1)}(t)$ is expressed as:

$$h_{s(n+1)}(t) = \begin{cases} h(t); t_{2n} \leq t \leq t_{1(n+1)} \\ h_N + h_2(t) = h_N + h(t) - h_1(t); t_{1(n+1)} \leq t \leq t_{2(n+1)} \end{cases} \quad (3)$$

Figures 1, 6:
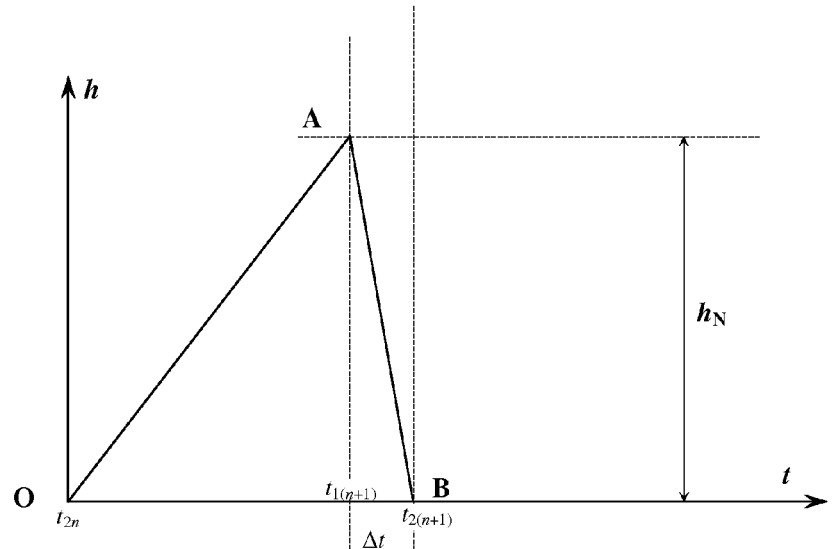
Figures 2, 6:
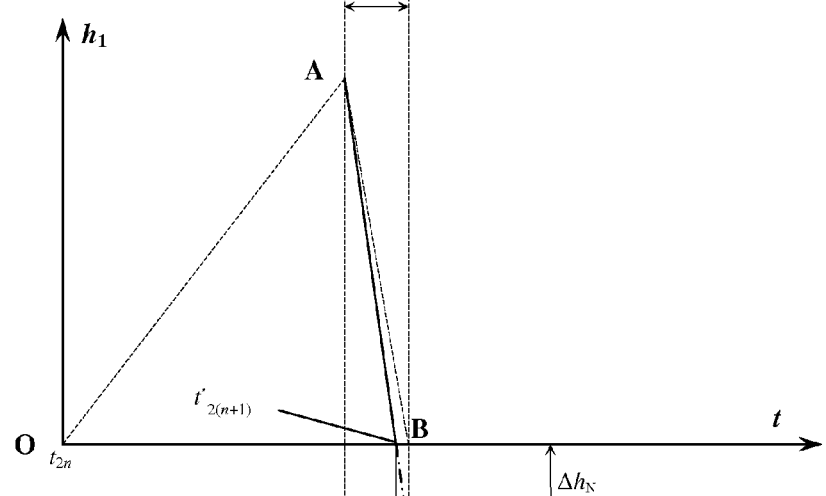
Figures 3, 6:
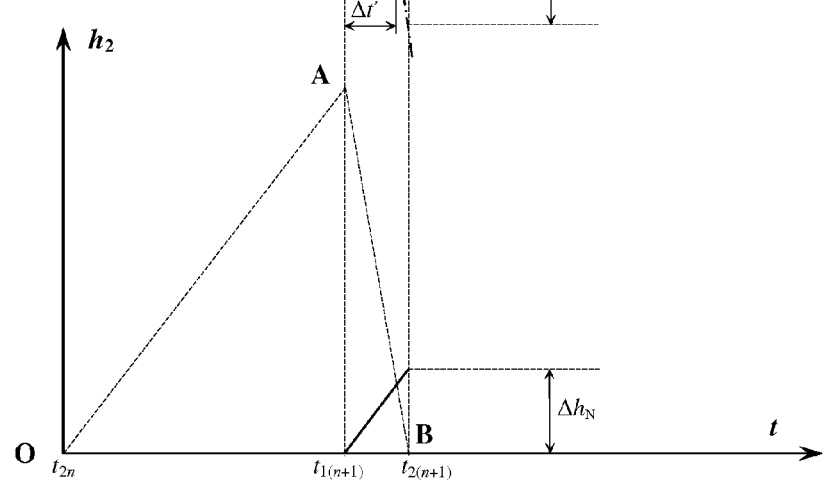

The formula (3) expresses any cycle of the water level of the measuring tube rising and falling by siphon drainage in rainfall process. When n=0, the formula (3) expresses the first cycle. The corresponding graphical representation of formula (3) is shown in FIGS. 6-1 to 6.3. When n=0, the single cycle expressed by FIG. 6-1 is the same as the single cycle expressed by FIG. 4-1. ($t_{20}$, $t_{11}$ and $t_{21}$ in FIG. 6-1 are corresponding with 0, $t_1$ and $t_2$ in FIG. 4-1 Separately). h(t) in formula (3) is measured actually. $h_1(t)$ in $t_{1(n+1)} \leq t \leq t'_{2(n+1)}$ is the inherent siphon drainage line that has been predetermined, while in $t_{2(n+1)} \leq t \leq t_{2(n+1)}$, $h_1(t)$ is an extended line of the inherent siphon drainage line. $t_{2(n+1)}$ can be determined by the moment when the cycle reaches its bottom in FIG. 6-1, and this can be realized by the corresponding programs at MCU in the measuring device. After obtaining $t_{2(n+1)}$, the programs of the MCU will make the extended line of the inherent siphon drainage line, and then $h_1(t)$ will be totally determined in $t_{1(n+1)} \leq t \leq t_{2(n+1)}$. The result of formula (3) is substituted to the formula (2) to obtain the measured value of rainfall with compensation $h_{rain}(t)$.

The invention claimed is:
1. An apparatus for remote siphon drainage type rainfall measurement, with self-compensation, comprising:
   an exit at a bottom of a water butt connected to a bottom of a rainfall measuring tube via a water hose;
   a siphon in the wall of the rainfall measuring tube;
   the rainfall measuring tube and a measuring device installed on a support bracket;
   the measuring device connected with a pressure sensor installed in the bottom of the rainfall measuring tube and a battery to provide power to the measuring device;
   the whole apparatus is installed in an outer barrel; and
   wherein a measured value of the amount of rainfall with compensation $h_{rain}(t)$ is determined by:
   collecting rainfall in the rainfall measuring tube;
   expressing the amount of rainfall at any time with self-compensation as:

$$h_{rain}(t) = K \cdot \left[ n \cdot h_N + \sum_{j=0}^{n} \Delta h_N(j) + h_{s(n+1)}(t) \right] \quad (1)$$

wherein in formula (1):
   $h_N$ is the maximum value of h(t), and the value of $h_N$ is determined by the structure of a siphon and the rainfall measuring tube, and wherein $h_N$ is a constant value in every single measurement;
   $\Delta h_N(j)$ is the amount of rainfall in $t_{1(n+1)} \leq t \leq t_{2(n+1)}$ in the siphon drainage process, during a cycle of the j+1th change of the water level of the rainfall measuring tube;
   as a rainfall rate is not constant, each $\Delta h_N(j)$ is generally different, such that $\Delta h_N(j-1) \neq \Delta h_N(j) \neq \Delta h_N(j+1)$;
   n denotes that the loop of the change of the water level of the rainfall measuring tube has completed n cycles, wherein the value of n can be any non-negative integer;
   K is a scale factor for converting the water level of the rainfall measuring tube into the amount of rainfall; and
   $h_{s(n+1)}(t)$ is expressed as:

$$h_{s(n+1)}(t) = \begin{cases} h(t); \ t_{2n} \leq t \leq t_{1(n+1)} \\ h_N + h(t) - h_1(t); \ t_{1(n+1)} \leq t \leq t_{2(n+1)} \end{cases} \quad (2)$$

formula (2) expressing an instantaneous aggregate-value of the water level of the rainfall measuring tube at any cycle of the water level of the rainfall measuring tube rising and falling by siphon drainage ($t_{2n} \leq t \leq t_{2(n+1)}$) in a rainfall process;
   wherein in formula (2):
   h(t) is an actual water level of the rainfall measuring tube;
   $h_1(t)$ in $t_{1(n+1)} \leq t \leq t'_{2(n+1)}$ is an inherent siphon drainage line, which is a known relationship that has been predetermined, while in $t'_{2(n+1)} \leq t \leq t_{2(n+1)}$, $h_1(t)$ is an extended line of the inherent siphon drainage line;
   $t_{2(n+1)}$ is determined by the moment when the cycle of the water level of the rainfall measuring tube rising and falling by siphon drainage reaches its lowest point;
   after obtaining $t_{2(n+1)}$, make the extended line of the inherent siphon drainage line, and then $h_1(t)$ will be totally determined in $t_{1(n+1)} \leq t \leq t_{2(n+1)}$;
   and substituting the result of formula (2) into formula (1) to obtain the measured value of the amount of rainfall with the compensation $h_{rain}(t)$.

2. The apparatus of claim 1, the measuring device comprising:
   an amplification and filtering circuit,
   an A/D conversion circuit,
   a single-chip microcomputer, and
   a remote transmission module GSM or GPRS;
   wherein one terminal of the amplification and filtering circuit is connected with the pressure sensor, and the other terminal is connected with the remote transmission module GSM or GPRS via the A/D conversion circuit and the single-chip microcomputer.

3. The apparatus of claim 2, wherein the amplification and filtering circuit uses a differential structure or an integrated instrument amplifier to constitute the amplification and filtering circuit, and an input signal is an output voltage signal of the pressure sensor which is in proportional to the water level, and the output signal is the output voltage signal of the amplification and filtering circuit.

4. The apparatus of claim 1 further comprising a processor for determining $t_{2(n+1)}$.

5. The apparatus of claim 1 further comprising a processor for making the extended line of the inherent siphon drainage line.

6. The apparatus of claim 1 further comprising a single chip microcomputer for running to determine $t_{2(n+1)}$ and to make the extended line of the inherent siphon drainage line.

7. An apparatus for remote siphon drainage type rainfall measurement comprising:
   an exit at a bottom of a water butt connected to a bottom of a rainfall measuring tube via a water hose;
   a siphon in the wall of the rainfall measuring tube for the automatic water drainage of the rainfall measuring tube;
   the rainfall measuring tube and a measuring device installed on a support bracket;
   the measuring device connected with a pressure sensor installed in the bottom of the rainfall measuring tube and a battery to provide power to the measuring device; and
   the whole apparatus is installed in an outer barrel;
   wherein the measuring device processes a signal of the pressure sensor to realize the remote siphon drainage type rainfall measurement;
   wherein the remote siphon drainage type rainfall measurement is determined by:
   expressing the amount of rainfall at any time with self-compensation as:

$$h_{rain}(t) = K \cdot \left[ n \cdot h_N + \sum_{j=0}^{n} \Delta h_N(j) + h_{s(n+1)}(t) \right] \quad (1)$$

wherein in formula (1):

$\Delta h_N(j)$ is the amount of rainfall in $t_{1(n+1)} \leq t \leq t_{2(n+1)}$ in the siphon drainage process, during a cycle of the j+1 th change of a water level of the rainfall measuring tube;

as a rainfall rate is not constant, each $\Delta h_N(j)$ is generally different, such that $\Delta h_N(j-1) \neq \Delta h_N(j) \neq \Delta h_N(j+1)$;

n denotes that the loop of the change of the water level of the rainfall measuring tube has completed n cycles, wherein the value of n can be any non-negative integer;

K is a scale factor for converting the water level of the rainfall measuring tube into the amount of rainfall; and $h_{s(n+1)}(t)$ is expressed as:

$$h_{s(n+1)}(t) = \begin{cases} h(t); \ t_{2n} \leq t \leq t_{1(n+1)} \\ h_N + h(t) - h_1(t); \ t_{1(n+1)} \leq t \leq t_{2(n+1)} \end{cases} \quad (2)$$

formula (2) expressing an instantaneous aggregate-value of the water level of the rainfall measuring tube at any cycle of the water level of the rainfall measuring tube rising and falling by siphon drainage ($t_{2n} \leq t \leq t_{2(n+1)}$) in a rainfall process;

wherein in formula (2):

h(t) is an actual water level of the rainfall measuring tube;

$h_1(t)$ in $t_{1(n+1)} \leq t \leq t'_{2(n+1)}$ is an inherent siphon drainage line, which is a known relationship that has been predetermined, while in $t'_{2(n+1)} \leq t \leq t_{2(n+1)}$, $h_1(t)$ is an extended line of the inherent siphon drainage line;

$t_{2(n+1)}$ is determined by the moment when the cycle of the water level of the rainfall measuring tube rising and falling by siphon drainage reaches its lowest point;

after obtaining $t_{2(n+1)}$, make the extended line of the inherent siphon drainage line, and then $h_1(t)$ will be totally determined in $t_{1(n+1)} \leq t \leq t_{2(n+1)}$;

and substituting the result of formula (2) into formula (1) to obtain the measured value of the amount of rainfall with compensation $h_{rain}(t)$.

\* \* \* \* \*